Patented Dec. 23, 1947

2,433,316

UNITED STATES PATENT OFFICE 2,433,316

PURIFICATION OF ALKYLARYL-
SULFONATES

Joseph J. Carnes, Greenwich, Conn., assignor to American Cyanamid Company, New York, N. Y., a corporation of Maine No Drawing. Application April 13, 1945,
Serial No. 588,244

8 Claims. (Cl. 260—505)

This invention relates to the purification of wetting or surface-active agents of the alkylated aromatic sulfonic acid type. The invention is directed to improved methods for the manufacture and particularly for the purification of wetting agents of this class in order to separate them from colored impurities and from inactive materials, such as unalkylated or insufficiently alkylated aromatic sulfonic acids, which they frequently contain.

Wetting agents are compounds which, by reason of their peculiar molecular structure, will orient or align themselves at an oil-water interface and thereby reduce the surface tension of the water and enable it to wet out or mix with an oil phase. This action is due to the presence, in the same molecule of a wetting agent, of a hydrophilic or water-solubilizing radical along with one or more hydrophobic groups. In the alkylated aromatic sulfonic acid wetting agents the sulfonic acid group is the hydrophilic radical and the alkyl radical or radicals constitutes the effective hydrophobic portion of the molecule. In order to obtain the proper type of surface-orientation, one or more alkyl radicals having a total of at least 4-5 carbon atoms must be present. This is particularly true of the alkaryl sulfonic acid wetting agents of the benzene and naphthalene series.

The alkylated naphthalene sulfonic acid wetting agents are usually prepared by sulfonating naphthalene with excess strong sulfuric acid and introducing a mixture of an aliphatic alcohol, usually isopropanol or butanol, with additional sulfuric acid. About 1.5-2.5 propyl or butyl radicals per mol of naphthalene are introduced by this method. The alkylation is completed by continued heating, after which the bulk of the sulfuric acid is separated out as a lower layer. The product is treated with lime, filtered, heated with sodium carbonate, again filtered and finally concentrated to a paste or to a dry powder.

The corresponding wetting agents of the benzene series also require a total of at least 4-5 carbon atoms in their alkyl portion before 'surface-orientation is obtained. However, they are usually alkylated with chlorinated kerosene, and therefore contain one or more alkyl radicals of 10-15 carbon atoms. The chlorinated kerosene is condensed with benzene, toluene or other mononuclear aromatic hydrocarbons, or with the corresponding phenols, using a condensation catalyst such as aluminum chloride. The resulting higher alkaryl hydrocarbons or phenols are then sulfonated by agitation with strong sulfuric acid. The sulfonation product is separated into layers and the sulfonic acid layer is neutralized with alkali and evaporated to dryness. The products are frequently sold in admixture with inorganic salts such as sodium sulfate.

The present invention is directed to improvements in the manufacture of wetting agents prepared by the above and similar processes, and has as its principal object the provision of a solvent extraction method for the purification of the wetting agents from various impurities which they may contain. A further important object of the invention is the provision of a purification method which will result in the production of surface-active agents of improved wetting power, better calcium tolerance, lighter and better color, and improved water-solubility characteristics. A still further object of the invention involves the application of solvent-extraction purification procedures to modified alkylation methods, as will hereinafter be more fully described and explained.

I have found that the wetting and surface tension-reducing power of many of the commercial alkylated aromatic sulfonic acid wetting agents can be greatly improved by purifying them from inactive materials that are frequently present, particularly unalkylated aromatic sulfonic acids. These impurities are often present in fairly large quantities; thus, for example, isopropyl naphthalene sulfonic acid wetting agents prepared by the method described above may contain as much as 10-15% of naphthalene sulfonic acids which are either unalkylated or which contain alkylated radicals having a total of less than 4-5 carbon atoms. The corresponding impurities in the mononuclear aromatic sulfonic acid wetting agents are more likely to be unalkylated sulfonic acids, since chlorinated kerosene will produce adequate alkylation if it combines at all. The purification method of the present invention will separate out and purify the aromatic sulfonic acids having the degree of alkylation sufficient to impart wetting properties, since it is based on the nonpolar solvent solubility of these compounds.

I have found that a substantially complete separation of alkylated aromatic sulfonic acids containing a total of at least 4-5 carbon atoms in the alkyl radicals from the corresponding unalkylated or less highly alkylated sulfonic acids can be obtained by the solvent action of vaporizable nonpolar organic solvents such as benzene, toluene, monochlorinated benzenes and toluenes, chlorinated lower aliphatic hydrocarbons and the like. The more highly alkylated aromatic sulfonic acids are preferentially soluble in solvents of this class, and can be extracted by agitation therewith, whereas the unalkylated and less highly alkylated aromatic sulfonic acids are preferentially water-soluble and are extracted only in minor quantities. The extraction is preferably carried out in the presence of free sulfuric acid, which has a salting-out effect on the sulfonic acids and aids in their extraction. Volatile solvents are employed so that they may be recovered by distillation procedures and reused.

Although the solvent extraction of crude alkylated aromatic sulfonic acids will effect a separation of wetting from non-wetting aromatic sulfonic acids the solvent will also take up colored tarry impurities, excess aliphatic compounds and their polymers and other undesired impurities that may be present in the mixture. I have found, however, that by making a second extraction of the organic solvent solution with water the alkaryl sulfonic acid can be transferred substantially completely to the aqueous phase while the undesired impurities remain in the organic solvent. The complete process of my invention therefore includes a first extraction of the crude wetting agents in the form of free sulfonic acids with a nonpolar solvent, which results in dissolving the more highly alkylated aromatic sulfonic acids therein, followed by separation of the organic solvent solution from residual material and extraction with water. The second or water-extraction transforms the alkaryl sulfonic acids into a water solution, but leaves behind in the organic solvent the greater part of the color-forming tarry impurities and also any excess alkylating agent that may have been present in the original composition. The recovery of active wetting agents by this method is about 95–98%.

The alkylated aromatic sulfonic acid obtained as a water solution by the second extraction may be neutralized with alkali before, during or after the separation of this face from the organic solvent. The addition of alkali to the water before completion of the extraction is frequently helpful in overcoming mechanical difficulties due to the formation of an emulsion. The organic solvent is separated from the water phase by decantation, residual quantities being removed by steam distillation if necessary, after which the aqueous solution may be evaporated to produce the dry product. The organic solvent is separated from impurities by distillation, preferably with the aid of steam, and reused for the extraction of further quantities of wetting agents.

Although any water-insoluble nonpolar organic solvent capable of dissolving an alkaryl sulfonic acid may be employed in practicing the invention, I prefer to use mononuclear aromatic hydrocarbons such as benzene, toluene, xylene and the like, the corresponding halogenated compounds such as monochlorbenzene, or halogenated aliphatic hydrocarbons such as ethylene dichloride (1,2-dichloroethane), dichlorethylene (1,2-dichloroethene), trichlorethylene, carbon bisulfide, carbon tetrachloride, and tetrachlorethane. Solvents of this type are capable of dissolving large quantities of alkaryl sulfonic acids from their aqueous sulfonation melts or reaction mixtures but have little or no solvent action on unalkylated or only partially alkylated aromatic sulfonic acids.

Upon neutralization with alkali and evaporation of the aqueous extract the surface-active agents are obtained in a highly purified condition. They contain little or none of the dark-colored tarry impurities that are present in surface-active agents of this class prepared by ordinary procedures; they are free from aromatic sulfonic acids having no wetting power and vary from pure white to light tan in color. Because they contain no water-insoluble materials they are readily soluble in water to clear solutions, and in many cases their calcium tolerance and detergency in salt solutions are improved. They possess greatly improved compatibility with alkali metal soaps of higher fatty acids, such as ordinary hard and soft sodium and potassium soaps, and are particularly well suited for admixture with these soaps.

The solvent extraction process of the present invention is particularly important in the preparation of alkaryl sulfonates by the pressure alkylation of aromatic sulfonic acids with olefins as described in my copending application Ser. No. 588,243 filed April 13, 1945, now abandoned. The alkylation with unsaturated aliphatic hydrocarbons results in surface-active agents of improved wetting properties, but the products are likely to be contaminated by greater quantities of tarry impurities because of greater polymerization of the olefins. Extraction of the olefin-alkylated sulfonation products with organic solvents followed by a second extraction of the solvent with water will effectively remove these tarry impurities and produce a product of light color and improved wetting properties. Diisopropyl and triisopropyl naphthalene beta-sulfonate, the corresponding butylated naphthalene sulfonates, as well as higher alkyl derivatives prepared by alkylation with olefins are especially well adapted for purification by this method.

It should be understood that the invention in its broader aspects is not limited to the purification of the alkaryl sulfonates during their manufacture. On the contrary, the solvent extraction process may be applied to the finished wetting agent compositions if desired. Thus, for example, it may be used for the further purification of standard commercial wetting agents of the type sold commercially as "Nacconol NR," (a keryl benzene sulfonate prepared as described in U. S. Patent No. 2,283,199) and "Aerosol OS," which is an alkylated naphthalene sulfonic acid prepared as described above, when the active ingredient of these compositions is required in a very pure form. Any of the above or similar compositions, which may contain substantial quantities or inorganic salts as well as tarry color-forming impurities, can readily be purified by dissolving them in acid solutions to liberate the free sulfonic acids and extracting with organic solvent and then with water or aqueous alkalies in the manner described above.

The invention will be illustrated in greater detail by the following specific examples. It should be understood, however, that these examples are given primarily for purposes of illustration, and that the invention in its broader aspects is not limited thereto.

*Example 1*

Naphthalene was sulfonated by heating it to 165° C. and introducing a total of 2.1 mols of 66° Bé. sulfuric acid for each mol of naphthalene over a period of 15 minutes, followed by heating at 160–165° C. for another 5 minutes. The mixture was cooled to 120° C. and alkylated by the addition during 2 hours of a mixture of isopropanol and 66° Bé. sulfuric acid containing 2.1 mols isopropanol and 0.65 mol sulfuric acid per mol of naphthalene. Heating was continued under a reflux condenser for 3 additional hours. The reaction mixture was then divided into several portions. One portion was worked up by separating into layers, adding hydrated lime to the upper layer, boiling and filtering off the calcium sulfate, boiling with sodium carbonate and filtering out the excess lime and evaporating the filtrate to a 75% paste. This is the standard procedure for preparing this type of wetting agent.

Another portion, amounting to 1.68 kg., was extracted by agitating it with 2 liters of toluene and allowing the mixture to separate into layers. The upper toluene layer contained the alkylated naphthalene sulfonic acid and also the color-forming tarry materials while the lower aqueous layer contained the unalkylated naphthalene sulfonic acid, corresponding to about 10% of the naphthalene used, in addition to the excess sulfuric acid. The lower layer was drawn off and discarded.

The toluene solution was divided into two equal portions of 1315 ml. each. One of these was mixed with 2 liters of water to form an emulsion which separated into two clear layers on standing over night. The toluene layer, which contained the tarry impurities, was distilled with steam to recover pure toluene for reuse. The aqueous layer was neutralized with sodium hydroxide solution and evaporated to dryness. The product was a light-cream colored powder.

The second portion of the toluene solution was mixed with 2 liters of water and the mixture was neutralized with sodium hydroxide solution. By this procedure the emulsion separated in two hours. The aqueous extract was evaporated to dryness and the product ground to an almost white powder.

The solvent-extracted wetting agent was compared with the standard product by the Draves test, which consists in measuring the sinking time of a standard grey cotton skein having a 1.5 gram weight attached, in solutions of the material under test at various concentrations. The calcium tolerances were also determined.

|  | Wetting Time in Seconds at Conc. | | | | Ca Tolerance, P. P. M. CaCO₃ at— | |
| --- | --- | --- | --- | --- | --- | --- |
|  | 0.35% | 0.25% | 0.20% | 0.15% | 0.25% | 0.05% |
| Standard | 14 | 36 | 68 | 150 | 480 | >2,250 |
| Solvent-extracted | 12.8 | 26.2 | 40.8 | 74 | 270 | 700 |

*Example 2*

Alkylated aromatic sulfonic acids prepared by alkylation under pressure with unsaturated aliphatic hydrocarbons are much more powerful wetting agents than the corresponding products alkylated with alcohols or ethers. However the pressure alkylation tends to promote the formation of larger quantities of tarry impurities which darken the product. The solvent extraction process of the present invention is therefore of particular importance in the manufacture of surface-active agents by this method.

Naphthalene was sulfonated by adding 422 grams (4.1 mols) of 96% sulfuric acid to 256 grams (2 mols) of naphthalene during fifteen minutes at 160–165° C. followed by heating with agitation at the same temperature for another 5 minutes. Under these conditions the product of the reaction is principally naphthalene beta-sulfonic acid.

The mixture was cooled to 100–110° C. and charged into an autoclave along with an additional 206 grams of 96% sulfuric acid. Stirring was begun and propylene was introduced at an initial temperature and pressure of 67° C. and 30 lbs. per sq. inch gage. The temperature was raised to 100–110° C. and the pressure to 50 p. s. i. during 45 minutes and maintained there until 191 grams (4.8 mols) of propylene had been introduced. Stirring and heating were continued at 90–100° C. for an additional 90 minutes, during which time the autoclave pressure fell to atmospheric.

The product from the autoclave was agitated with 1 liter of toluene. The resulting toluene solution was allowed to form an upper layer which was drawn off and extracted by agitation with 2 liters of water. The resulting aqueous solution was neutralized to a pH of 7.5 with 10% sodium hydroxide and evaporated to dryness, the product being a cream-colored solid. Analysis showed 10.31% sulfur and 23.9% ash. The product therefore contained 2.1% sodium sulfate and the equivalent weight of the organic material was 318, corresponding to 2.1 isopropyl groups per sulfonic acid group.

The Draves test gave the following results:

|  | Wetting time in Seconds at conc. | | | | |
| --- | --- | --- | --- | --- | --- |
|  | 0.35% | 0.25% | 0.2% | 0.15% | 0.1% |
| Standard | 14 | 36 | 68 | 150 |  |
| This Example |  | <10 | 16 | 34.2 | 78.6 |

*Example 3*

The procedure described in Example 1 was followed, but the propylation was continued until 6.4 mols of propylene had been introduced. Stirring was continued for an additional 45 minutes, after which the autoclave was discharged and the contents extracted with toluene. The toluene solution was extracted with water and the resulting aqueous solution was neutralized with sodium hydroxide and evaporated to dryness. The product analyzed 9.44% sulfur and 23.3% ash, and therefore had an equivalent weight of 364, contained 4.7% Na₂SO₄ and contained an average of 3.2 isopropyl groups for each sulfonic acid radical.

The Draves test gave the following results:

|  | Wetting Time in Seconds at Conc. | | | | | | |
| --- | --- | --- | --- | --- | --- | --- | --- |
|  | 0.35% | 0.25% | 0.2% | 0.15% | 0.1% | 0.075% | 0.05% |
| Standard | 14 | 36 | 68 | 150 |  |  |  |
| This Example |  |  | 5 | 14.6 | 33.3 | 53.7 | 102 |

*Example 4*

Naphthalene was sulfonated by heating 128 grams (1 mol) to 165° C. and adding 214 grams (2.1 mols) of 96% sulfuric acid with stirring during 15 minutes, followed by heating at 160–165° C. for another 5 minutes. An additional 100 grams of sulfuric acid was then added, cooling the reaction mixture to 90° C., and 211 grams of n-hexene was introduced, under reflux and with stirring, over a period of about 2 hours. During this time the temperature remained at 90–100° C. Stirring was continued for another 2 hours at 90° C.

The reaction mixture was cooled, extracted with 0.5 liter of toluene, and the toluene solution poured into 2 liters of water. The resulting aqueous solution was separated from the toluene fraction, neutralized to a pH of 8.5 by adding sodium hydroxide solution, and evaporated to dryness. The product analyzed 11% sulfur and 26.7% ash, contained 4.6% sodium sulfate and had an equivalent weight of 310. It therefore contained one hexyl group for each mol of naphthalene.

The Draves test gave the following results:

|  | Wetting Time in Seconds at Conc. | | | | | | | |
|---|---|---|---|---|---|---|---|---|
|  | 0.35% | 0.25% | 0.2% | 0.15% | 0.1% | 0.075% | 0.05% | 0.03% |
| Standard | 14 | 36 | 68 | 150 |  |  |  |  |
| Sec. Hexyl | 10 | 13 | 19 | 27 | 36 | 44 | 64 | 150 |

*Example 5*

Naphthalene was sulfonated and the resulting mixture was alkylated by reaction with butylene, using the apparatus and procedure described in Example 1. Butene-2 was passed into the autoclave at pressures of 25–33 lbs. per sq. in. and temperatures of 85–95° C. for about 5 hours. At the end of this time 375 grams (6.7 mols) of the butylene were absorbed. The mixture was then cooled and extracted with toluene and the toluene solution was extracted with water. The resulting water solution was brought to a pH of 8.0 by addition of sodium hydroxide solution and evaporated to dryness. The product was a light tan solid which was readily soluble in water to a clear, light colored solution. Analysis showed it to contain 10.6% sulfur and 25.4% ash. It therefore contained 3.8% sodium sulfate and had an equivalent weight of 317, indicating an average content of 1.6 butyl radicals for each mol of sulfonic acid.

The Draves test gave the following results:

|  | 0.35% | 0.25% | 0.2% | 0.15% | 0.1% | 0.075% | 0.05% |
|---|---|---|---|---|---|---|---|
| Standard | 14 | 36 | 68 | 150 |  |  |  |
| This Example |  | 10 | 10 | 15.5 | 33.6 | 45 | 90 |

*Example 6*

65 grams of keryl benzene, obtained by condensing chlorinated kerosene with benzene, was placed in a 200 cc. flask in an ice bath and was stirred vigorously while 20 cc. of fuming sulfuric acid (20% SO$_3$) were added over a period of ten minutes. The mixture was stirred at 0–5° C. for one hour. At the end of this time 3 cc. of water were added and then 75 cc. toluene. After shaking thoroughly, the acid layer was removed and discarded. The toluene solution of the sulfonic acid was poured into 300 cc. of water, and the emulsion which formed was neutralized with 10% sodium hydroxide. The mixture was diluted to 1.5 liters with warm water and 200 cc. of toluene were added. A small amount of n-butyl alcohol assisted in breaking the emulsion. After three hours complete separation into two clear layers had occurred. The aqueous layer was removed and evaporated to dryness to yield sodium dodecylbenzene sulfonate, a light tan solid.

*Example 7*

Sixty grams of Nacconol NR were mixed with 100 cc. of 96% sulfuric acid and stirred until no more solid would dissolve. The acid was extracted with 75 cc. of toluene. The toluene solution was added to 300 cc. of water and the emulsion which formed was neutralized with 10% sodium hydroxide (50 cc.). The mixture was diluted to one liter and 100 cc. of toluene were added. After standing for several hours, the emulsion separated into two liquid phases. The aqueous layer was withdrawn and evaporated to dryness. The product was a light tan solid, weighing 22 g.

What I claim is:

1. A method for the purification of a wetting agent of the alkylated aromatic sulfonic acid type which comprises extracting the crude wetting agent in the form of its free sulfonic acid with a vaporizable, water-insoluble non-polar solvent to form a solution therein of alkylated aromatic sulfonic acid free from unalkylated aromatic sulfonic acid, separating said solution from residual material and extracting it with water.

2. A method for the purification of a wetting agent of the alkylated aromatic sulfonic acid type which comprises preparing an acidified mixture of the free sulfonic acid of said wetting agent, extracting the mixture with a vaporizable, water-insoluble nonpolar solvent to form a solution therein of alkylated aromatic sulfonic acid free from unalkylated aromatic sulfonic acid, separating said solution from residual material and extracting it with water.

3. A method for the purification of a wetting agent of the alkylated naphthalene sulfonic acid type which comprises extracting the crude wetting agent in the form of its free sulfonic acid with a vaporizable, water-insoluble nonpolar solvent to form a solution therein of alkylated naphthalene sulfonic acid free from unalkylated aromatic sulfonic acid, separating said solution from residual material and extracting it with water.

4. A method for the purification of a wetting agent of the alkylated mononuclear aromatic sulfonic acid type which comprises extracting the crude wetting agent in the form of its free sulfonic acid with a vaporizable, water-insoluble nonpolar solvent to form a solution therein of alkylated mononuclear aromatic sulfonic acid free from unalkylated aromatic sulfonic acid, separating said solution from residual material and extracting it with water.

5. A method for the production of a purified wetting agent of the alkylated naphthalene sulfonic acid type which comprises alkylating naphthalene sulfonic acid in the presence of sulfuric acid to form an alkylation mixture, extracting said mixture with a vaporizable, water-insoluble nonpolar solvent to form a solution therein of alkylated naphthalene sulfonic acid free from unalkylated aromatic sulfonic acid, separating said solution from residual material and extracting it with water, and neutralizing the sulfonic acid in the resulting water solution and evaporating water therefrom to obtain the purified wetting agent in concentrated form.

6. A method for the production of a purified wetting agent of the alkylated benzene sulfonic acid type which comprises sulfonating an alkylated benzene mixture obtained by condensing a member of the group consisting of benzene and toluene with chlorinated kerosene, extracting the sulfonation product in the presence of excess sulfuric acid with a vaporizable, water-insoluble nonpolar solvent to form a solution therein of alkylated benzene sulfonic acid free from unalkylated aromatic sulfonic acid, separating said solution from residual material and extracting it with water, and neutralizing the sulfonic acid in the resulting water solution and evaporating water therefrom to obtain the purified wetting agent in concentrated form.

7. A method of producing purified alkylated naphthalene sulfonate wetting agents of improved wetting properties which comprises heating a naphthalene sulfonic acid with an olefine of 3 to 6 carbon atoms in the presence of an alkylation catalyst under superatmospheric pressure until an alkylated naphthalene sulfonic acid product is formed, which product also contains unalkylated naphthalene sulfonic acids and tarry impurities resulting from polymerization of the olefine, separating the crude alkylated naphthalene sulfonic acids together with tarry impurities from the residual unalkylated naphthalene sulfonic acids by extracting the mixture with a vaporizable aromatic hydrocarbon, and recovering a purified alkylated naphthalene sulfonate wetting agent by separating the extract from residual undissolved material and extracting it with water.

8. A method of producing a purified propylated naphthalene sulfonate wetting agent of improved wetting properties which comprises reacting propylene with a naphthalene sulfonic acid in the presence of a sulfuric acid alkylation catalyst under superatmospheric pressure until a propylated naphthalene sulfonic acid product is formed, which product also contains unalkylated naphthalene sulfonic acids and tarry impurities resulting from polymerization of the propylene, separating the crude propylated naphthalene sulfonic acids together with tarry impurities from the residual unalkylated naphthalene sulfonic acids by extracting the mixture with a vaporizable aromatic hydrocarbon, and recovering a purified propylated naphthalene sulfonate wetting agent by separating the extract from residual undissolved material and extracting it with water.

JOSEPH J. CARNES.

REFERENCES CITED

The following references are of record in the file of this patent:

UNITED STATES PATENTS

| Number | Name | Date |
|---|---|---|
| 1,211,923 | Dennis | Jan. 9, 1917 |
| 1,228,414 | Dennis | June 5, 1917 |
| 1,229,593 | Dennis | June 12, 1917 |
| 1,750,198 | Schrauth | Mar. 11, 1930 |
| 2,283,199 | Flett | May 19, 1942 |

FOREIGN PATENTS

| Number | Country | Date |
|---|---|---|
| 364,537 | Great Britain | Dec. 22, 1931 |
| 514,080 | Germany | Dec. 6, 1930 |
| 544,889 | Germany | Mar. 1, 1932 |